United States Patent
Dyson et al.

(10) Patent No.: US 9,591,957 B2
(45) Date of Patent: Mar. 14, 2017

(54) AUTONOMOUS VACUUM CLEANER

(71) Applicant: Dyson Technology Limited, Wiltshire (GB)

(72) Inventors: James Dyson, Bristol (GB); Peter David Gammack, Swindon (GB); Mark Stamford Vanderstegen-Drake, Gloucester (GB); Andre David Brown, Taunton (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 125 days.

(21) Appl. No.: 13/897,089

(22) Filed: May 17, 2013

(65) Prior Publication Data
US 2013/0305484 A1 Nov. 21, 2013

(30) Foreign Application Priority Data
May 17, 2012 (GB) .................... 1208722.7

(51) Int. Cl.
*A47L 9/28* (2006.01)
*A47L 9/16* (2006.01)
(Continued)

(52) U.S. Cl.
CPC ............. *A47L 9/1608* (2013.01); *A47L 9/009* (2013.01); *A47L 9/02* (2013.01); *A47L 9/106* (2013.01);
(Continued)

(58) Field of Classification Search
CPC .... A47L 9/1608; A47L 9/1616; A47L 9/1409; A47L 9/1625; A47L 9/1541;
(Continued)

(56) References Cited

U.S. PATENT DOCUMENTS 6,171,375 B1 * 1/2001 Howie .............................. 96/17
7,120,965 B2 * 10/2006 Hisano et al. .................. 15/413
(Continued)

FOREIGN PATENT DOCUMENTS

DE 20 2005 014 736 4/2006
EP 0 803 224 10/1997
(Continued)

OTHER PUBLICATIONS

International Search Report and Written Opinion mailed Oct. 22, 2013, directed to International Application No. PCT/GB2013/051214; 19 pages.
(Continued)

*Primary Examiner* — David Redding
(74) *Attorney, Agent, or Firm* — Morrison & Foerster LLP

(57) ABSTRACT

An autonomous vacuum cleaner comprising a main body comprising a dirty air inlet, a clean air outlet, an airflow path extending between the dirty air inlet and the clean air outlet, a separating apparatus arranged in the airflow path between the dirty air inlet and the clean air outlet, and an airflow generator for generating an airflow along the airflow path from the dirty air inlet to the clean air outlet. The airflow generator has a discharge portion which discharges airflow into a chamber formed in the main body, the chamber including an opening that is closable by a removable panel, wherein a power source is receivable within the chamber formed in the main body and is removable from the chamber through the opening.

13 Claims, 16 Drawing Sheets

(51) Int. Cl.
*A47L 9/00* (2006.01)
*A47L 9/02* (2006.01)
*A47L 9/10* (2006.01)
*A47L 9/12* (2006.01)
*A47L 9/14* (2006.01)
*A47L 9/24* (2006.01)
*H01M 2/10* (2006.01)
*H01M 10/66* (2014.01)

(52) U.S. Cl.
CPC .............. *A47L 9/12* (2013.01); *A47L 9/122* (2013.01); *A47L 9/1409* (2013.01); *A47L 9/1616* (2013.01); *A47L 9/1625* (2013.01); *A47L 9/1641* (2013.01); *A47L 9/1666* (2013.01); *A47L 9/1683* (2013.01); *A47L 9/1691* (2013.01); *A47L 9/242* (2013.01); *A47L 9/2884* (2013.01); *A47L 9/2889* (2013.01); *H01M 2/1022* (2013.01); *H01M 10/66* (2015.04); *A47L 2201/00* (2013.01); *H01M 2220/30* (2013.01)

(58) Field of Classification Search
CPC .... A47L 9/1666; A47L 9/2884; A47L 9/2889; A47L 9/122; A47L 2201/00; H01M 2/1022; H01M 10/66; H01M 2220/30
USPC ................ 15/319, 339, 340.1–340.4, DIG. 8
IPC ........................................................ A47L 9/28
See application file for complete search history.

(56) References Cited

U.S. PATENT DOCUMENTS

| | | | |
|---|---|---|---|
| 7,749,294 B2 * | 7/2010 | Oh et al. | 55/356 |
| 2012/0011669 A1 | 1/2012 | Schnittman et al. | |

FOREIGN PATENT DOCUMENTS

| | | |
|---|---|---|
| EP | 1 498 999 | 1/2005 |
| EP | 1 525 838 | 4/2005 |
| FR | 2 624 714 | 6/1989 |
| GB | 2 344 778 | 6/2000 |
| JP | 10-5158 | 1/1998 |
| JP | 2001-321310 | 11/2001 |
| JP | 2002-360480 | 12/2002 |
| JP | 2003-219990 | 8/2003 |
| JP | 2006-205162 | 8/2006 |
| JP | 2009-89948 | 4/2009 |
| WO | WO-00/36968 | 6/2000 |
| WO | WO-00/38025 A1 | 6/2000 |
| WO | WO-2004/041054 | 5/2004 |
| WO | WO-2007/142487 | 12/2007 |
| WO | WO-2008/009886 | 1/2008 |

OTHER PUBLICATIONS

Search Report dated Sep. 17, 2012, directed to GB Application No. 1208722.7; 1 page.

* cited by examiner

AUTONOMOUS VACUUM CLEANER

REFERENCE TO RELATED APPLICATIONS

This application claims the priority of United Kingdom Application No. 1208722.7, filed May 17, 2012, the entire contents of which are incorporated herein by reference.

FIELD OF THE INVENTION

This invention relates to an autonomous or 'robotic' vacuum cleaner.

BACKGROUND OF THE INVENTION

Mobile robots are becoming increasingly commonplace and are used in such diverse fields as space exploration, lawn mowing and floor cleaning. The last decade has seen particularly rapid advancement in the field of robotic floor cleaning devices, especially vacuum cleaners, the primary objective of which is to navigate an area of a home or office autonomously and unobtrusively whilst cleaning the floor.

A known self-guiding vacuum cleaner is exemplified in EP0803224, which vacuum cleaner includes a chassis supporting a housing with a cover and a front part which is movable with respect to the chassis and forms part of a collision detecting system. To pick up dirt from a floor surface, the vacuum cleaner includes a brush nozzle facing the floor, the brush nozzle leading to an opening in communication with a chamber (16) within which a dirt container is stored, the dirt container here being in the form of a bag. Dirt is separated from the air by the pores of the bag when air flows out of the bag, after which air flows into the body of the machine, past a motor and fan unit and through a set of outlet openings to the atmosphere. It will be appreciated that such a means of separating dirt and dust from an airflow suffers from the usual problems that the pores of the dirt container can block, which reduces the efficiency of the vacuum cleaning function of the appliance.

Other autonomous vacuum cleaners are known which function primarily as floor sweepers although they also have a small vacuum function to control dust generation from the machine.

Another example of an autonomous vacuum cleaner is described in WO00/36968. Here, a robotic unit comprises a chassis to which is mounted a cleaner head having a suction opening and a rotatably driven brush bar. The chassis also includes a motor and fan unit which is configured to draw dirty air into the vacuum cleaner via the suction opening in the cleaner head. A cyclonic separator is carried on the chassis and dirty airflow is ducted into the cyclonic separator from the cleaner head. Once the dirty air has been cleaner by the cyclonic separator, the exiting air is conducted past the motor and fan unit so that the motor can be cooled before the air is expelled from the machine to atmosphere. Optionally, a motor can be incorporated at a downstream position of the motor and fan unit in order to filter fine contaminants that may not have been stripped from the air flow by the cyclonic separator. Although a robotic vacuum cleaner equipped with a cyclonic separation as described above avoids the need for traditional bags and filters, the cyclonic separation system must operate with a very high degree of efficiency, which is difficult to achieve in a small space envelope inherent in robotic vacuum cleaners.

It is with a view to improving the separation efficiency of robotic vacuum cleaners that the present invention has been devised.

SUMMARY OF THE INVENTION

In a first aspect, the invention provides an autonomous vacuum cleaner comprising a main body having a dirty air inlet, a clean air outlet, an airflow path between the dirty air inlet and the clean air outlet and a primary separating apparatus arranged in the air flow path between the dirty air inlet and the clean air outlet. The primary separating apparatus comprising at least one cyclone, and the main body includes a secondary separating apparatus in the airflow path downstream of the primary separating apparatus. The secondary separating apparatus comprising a container and a filter element, wherein the container is arranged in the air flow such that air flows through the container and the filter element.

Preferably, the container further includes an air inlet through which air can flow into the container and then flow out of the container through the filter element. In this way contaminants may be lodged in the material of the filter element, but larger contaminants may be collected in the container. Such a configuration enables a less efficient primary cyclonic separating apparatus to be used since the secondary separation system is operable to collect any contaminants that the cyclone system has not removed from the airflow. In one sense, therefore, the separation system is distributed across the primary and secondary apparatus, which may both be removable independently from the main body of the machine. Since a less efficient primary cyclone system can be used, it is possible to configure this more compactly which is a benefit in mobile autonomous applications.

The primary separating apparatus may be arranged on the main body in a substantially upright orientation, that is to say, so that its longitudinal axis is substantially normal to the floor surface on which the robot travels. In one embodiment, the main body defines a docking bay into which the primary secondary apparatus is received, and the wall of the docking bay may be shaped to complement the outer side profile of the separating apparatus. In this way, the primary separating apparatus can be received snugly into a complementary shaped bay or recess o the made body in a visually striking position for the user.

In a particularly space efficient configuration, the separating apparatus may be received in a recess defined in the docking bay portion and includes a closure member that defines a portion of the wall of the docking bay portion. Also, the closure member may define an air inlet of the secondary separating apparatus which may abut directly an outlet of the primary separating apparatus when it is in a docked position. Therefore, the primary and secondary separating apparatus are closely coupled which minimizes losses and ensures a compact arrangement.

To enable a user to remove and replace the secondary separating apparatus with ease, the closure member may be provided with a gripping portion, which may be in the form of a rib or other suitable finger-engaging feature.

In the preferred embodiment, the secondary separating abuts the primary separating apparatus and so is placed in a position which is fluidly upstream of the an airflow generator. As a further part of the overall separating system of the robot, a second filter member or 'post-motor filter' may be positioned downstream of the airflow generator and may be incorporated into removable external panel of the machine.

Accordingly, in a second aspect, the invention provides an autonomous vacuum cleaner comprising a main body comprising a dirty air inlet, a clean air outlet, an airflow path extending between the dirty air inlet and the clean air outlet, a separating apparatus arranged in the airflow path between the dirty air inlet and the clean air outlet, and an airflow generator for generating an airflow along the airflow path from the dirty air inlet to the clean air outlet. The airflow generator has a discharge portion which discharges airflow into a chamber formed in the main body, the chamber including an opening that is closable by a removable panel, wherein a power source is receivable within the chamber formed in the main body and is removable from the chamber through the opening.

Preferably, the removable panel is configured to permit air to pass through it so that air discharged from the airflow generator into the chamber exits the chamber through the removable panel. Further, the removable panel may incorporate a filter element such that air that passes through the panel must pass through the filter element.

The power source therefore is stored in a chamber that forms part of the airflow path of the machine. One benefit of this is that the flow of air from the airflow generator can usefully be employed to cool the power source, which may be a battery pack or other suitable power source. However, making use of a chamber in the airflow path in this way is space efficient as there is no need to provide a dedicated isolated battery compartment in the machine.

Although the removable panel, which preferable forms part of the outer skin of the machine, may simply click in and out of position, for a more secure option the panel may be provided with a catch to secure the panel to the machine.

In one embodiment, the separating apparatus comprises a first upstream cyclone and a plurality of second cyclones in parallel with one another, and which may be arranged substantially radially around the axis of the first cyclone. Such a multi-cyclonic configuration improves the separation efficiency of the primary separating apparatus.

It should be appreciated that preferred and/or optional features of the first aspect of the invention may be combined with the second aspect of the invention, and vice versa.

BRIEF DESCRIPTION OF THE DRAWINGS

In order that the invention may be more readily understood, reference will now be made, by way of example only, to the accompanying drawings in which:

FIG. 6b is a section view along the line B-B in FIG. 6a;

DETAILED DESCRIPTION OF THE INVENTION

Figure 1:
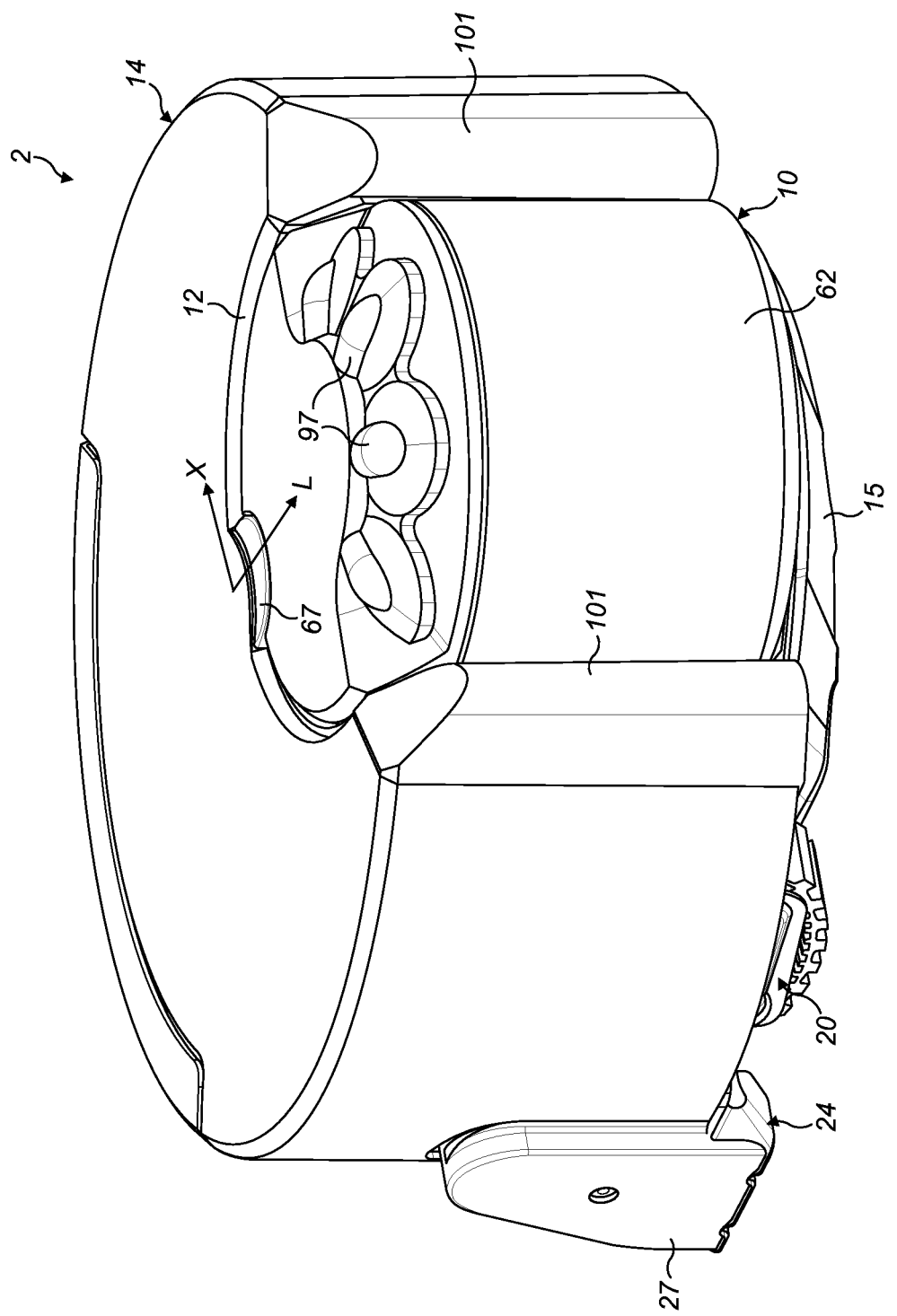
FIG. 1 is a front perspective view of an appliance in accordance with an embodiment of the invention.

With reference to FIGS. 1, 2, 3, 4 and 5 of the drawings, an autonomous surface treating appliance in the form of a robotic vacuum cleaner 2 (hereinafter 'robot') has a main body comprising four principal assemblies: a chassis (or sole plate) 4, a body 6 which is carried on the chassis 4, a generally circular outer cover 8 which is mountable on the chassis 4 and provides the robot 2 with a generally circular profile, and a primary separating apparatus 10 that is carried on a forward part of the body 6 and which protrudes through a complementary shaped cut-out 12 of the outer cover 8.

For the purposes of this specification, the terms 'front' and 'rear' in the context of the robot will be used in the sense of its forward and reverse directions during operation, with the separating apparatus 10 being positioned at the front of the robot. Similarly, the terms 'left' and 'right' will be used with reference to the direction of forward movement of the robot.

The chassis 4 supports several components of the robot and is preferably manufactured from a high-strength injection moulded plastics material, such as ABS (Acrylonitrile Butadiene Styrene), although it could also be made from appropriate metals such as aluminium or steel, or composite materials such a carbon fibre composite. As will be explained, the primary function of the chassis 4 is as a drive platform and to carry cleaning apparatus for cleaning the surface over which the robot travels.

A front portion 14 of the chassis 4 is relatively flat and tray-like in form and defines a curved prow 15 that forms the front of the robot 2. Each flank of the front portion 14 of the chassis has a recess 18 in which recesses a respective traction unit 20 is mountable. It should be noted that in this embodiment, the traction units 20 are in the form of electrically driven caterpillar-track units having a continuous rubberized belt or track constrained around leading and trailing pulley wheels, although a simple wheel arrangement could also be used as an alternative. The traction units are not central to the invention so a detailed explanation will be omitted.

The pair of traction units 20 are located on opposite sides of the chassis 4 and are operable independently to enable to robot to be driven in forward and reverse directions, to follow a curved path towards the left or right, or to turn on the spot in either direction, depending on the speed and direction of rotation of the traction units 20. Such an arrangement is sometimes known as a differential drive. The exact form of traction unit is not central to the invention and so will not be described in further detail.

The relatively narrow front portion 14 of the chassis 4 widens into rear portion 22 which includes a cleaner head 24 having a generally cylindrical form and which extends transversely across the chassis 4 relative to its longitudinal axis 'L' that is oriented in the fore-aft direction of the robot 2.

The cleaner head 24 defines a rectangular suction opening 26 that faces the supporting surface and into which dirt and debris is drawn into when the robot 2 is operating. An elongate brush bar 28 is contained within the cleaner head 24 and is driven by an electric motor 30 via a drive belt arrangement 32 in a conventional manner, although other drive configurations such as a geared transmission are also envisaged.

The underside of the chassis 4 forward of the suction opening 26 includes a plurality of channels 33 (only two of which are labeled for brevity) which provide pathways for dirty air being drawn towards the suction opening 26. The underside of the chassis 4 also carries a plurality (four in the illustrated embodiment) of passive wheel or rollers 31 which provide further bearing points for the chassis 4 when it is at rest on or moving over a floor surface.

In this embodiment, the cleaner head 24 and the chassis 4 are a single plastics moulding, thus the cleaner head 24 is integral with the chassis 4. However, this need not be the case and the two components could be separate, the cleaner head 24 being suitably affixed to the chassis 4 as by screws or bonding.

The cleaner head 24 has first and second end faces 27, 29 that extend to the edge of the chassis 4 and which are in line with the cover 8 of the robot. It can be seen that the end faces 27, 29 of the cleaner head are flat and extend at a tangent to the cover 8 at diametrically opposed points along the lateral axis 'X' of the robot 2. The benefit of this is that the cleaner head 24 is able to run extremely close to the walls of a room as the robot traverses in a 'wall following' mode therefore be able to clean right up to the wall on either side of the robot 2.

Dirt drawn into the suction opening 26 during a cleaning operation exits the cleaner head 24 via a conduit 34 which extends upwardly from the cleaner head 24 and curves towards the front of the chassis 4 through approximately 90° of arc until it faces in the forwards direction. The conduit 34 terminates in a rectangular mouth 36 having a flexible bellows arrangement 38 shaped to engage with a complementary shaped duct 42 provided on the body 6. It should be noted at this point that a bellows arrangement is optional and that a simple foam seal could be used instead.

The duct 42 is provided on a front portion 46 of the body 6, and opens into a forward facing generally semi-cylindrical recess 50 having an internal wall, the base edge of which defines a generally circular base platform 48. The recess 50 and the platform 48 provide a docking bay portion into which the separating apparatus 10 is mounted, in use, and from which it can be disengaged for emptying purposes. The internal wall has a circular profile to complement the circular cylindrical outer profile of the separating apparatus 10.

When the separating apparatus 10 is engaged in the docking portion 50, a dirty air inlet 52 of the separating apparatus 10 is received by the duct 42 and the other end of the duct 42 is connectable to the mouth 36 of the brush bar conduit 34, such that the duct 42 transfers the dirty air from the cleaner head 24 to the separating apparatus 10. The bellows arrangement 38 provides the mouth 36 of the conduit 34 with a degree of resilience so that it can mate sealingly with the dirty air inlet 52 of the separating apparatus 10 despite some angular misalignment. However, it should be appreciated that the flexible bellows arrangement 38 would not be necessary if movement was not permitted between the duct 42 and the conduit 34.

Figure 7:
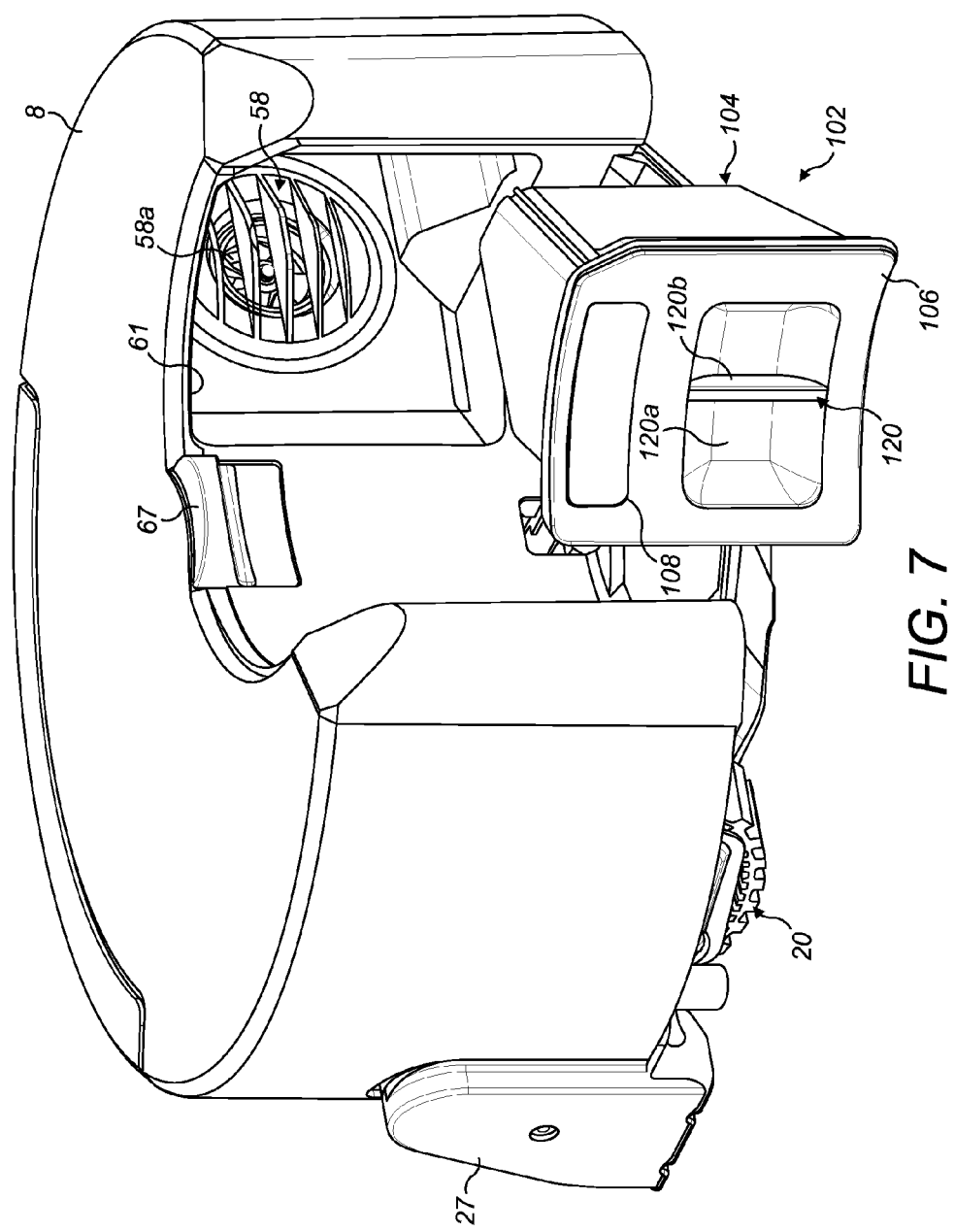
FIG. 7 is a view like that in FIG. 4, but with the secondary separation apparatus removed.

Dirty air is drawn through the separating apparatus 10 by an airflow generator which, in this embodiment, is an electrically powered motor and fan unit 58 that is located in a motor housing 60 located on the left hand side of the body 6. An impeller 58a of the airflow generator can be seen in FIG. 7.

The motor housing 60 includes a curved inlet mouth 61 that opens at the cylindrical shaped wall of docking portion 50 thereby to match the cylindrical curvature of the separating apparatus 10.

Figure 6A:
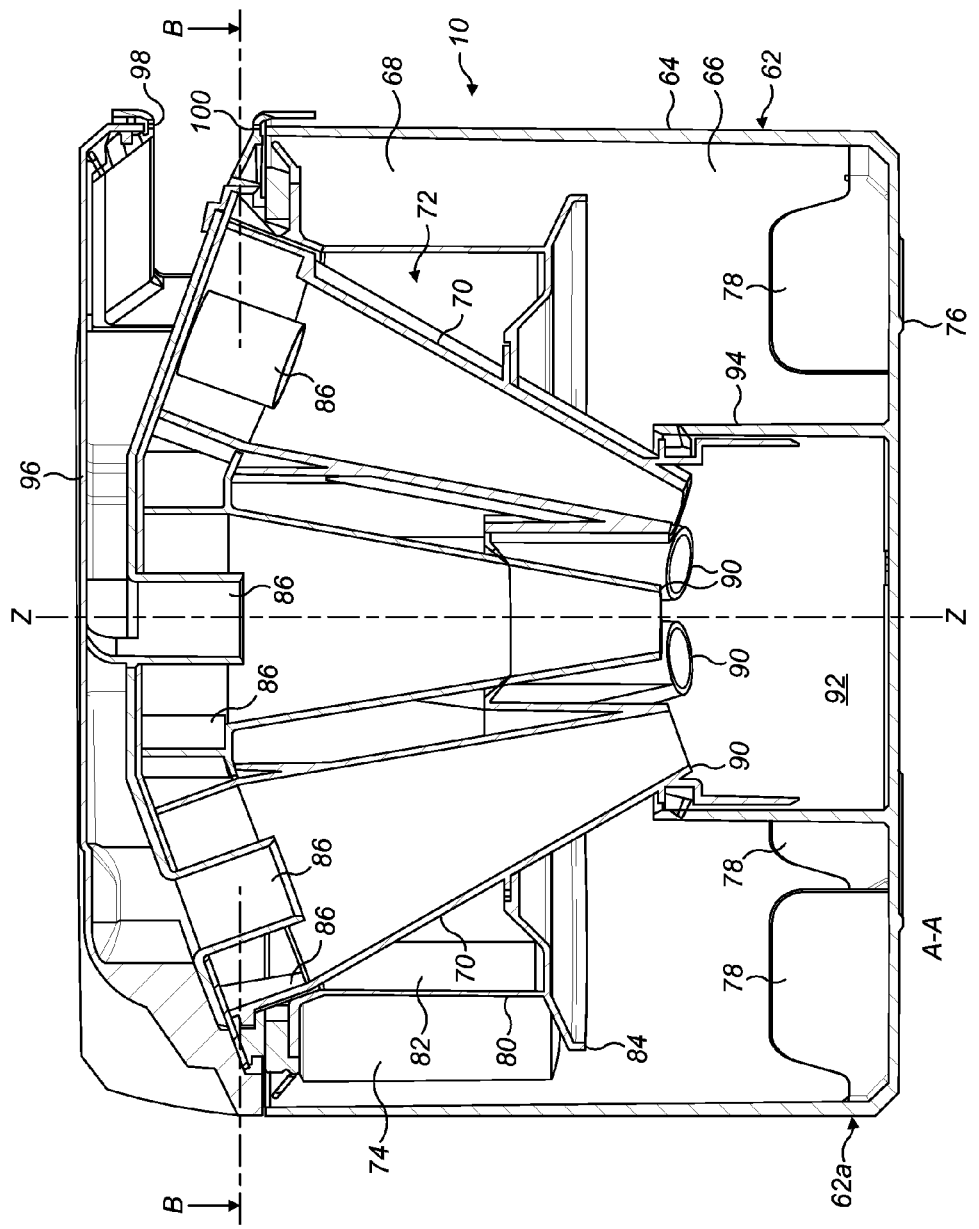
FIG. 6a is a section view of the separation apparatus along the line A-A in FIG. 4.
Figure 6B:
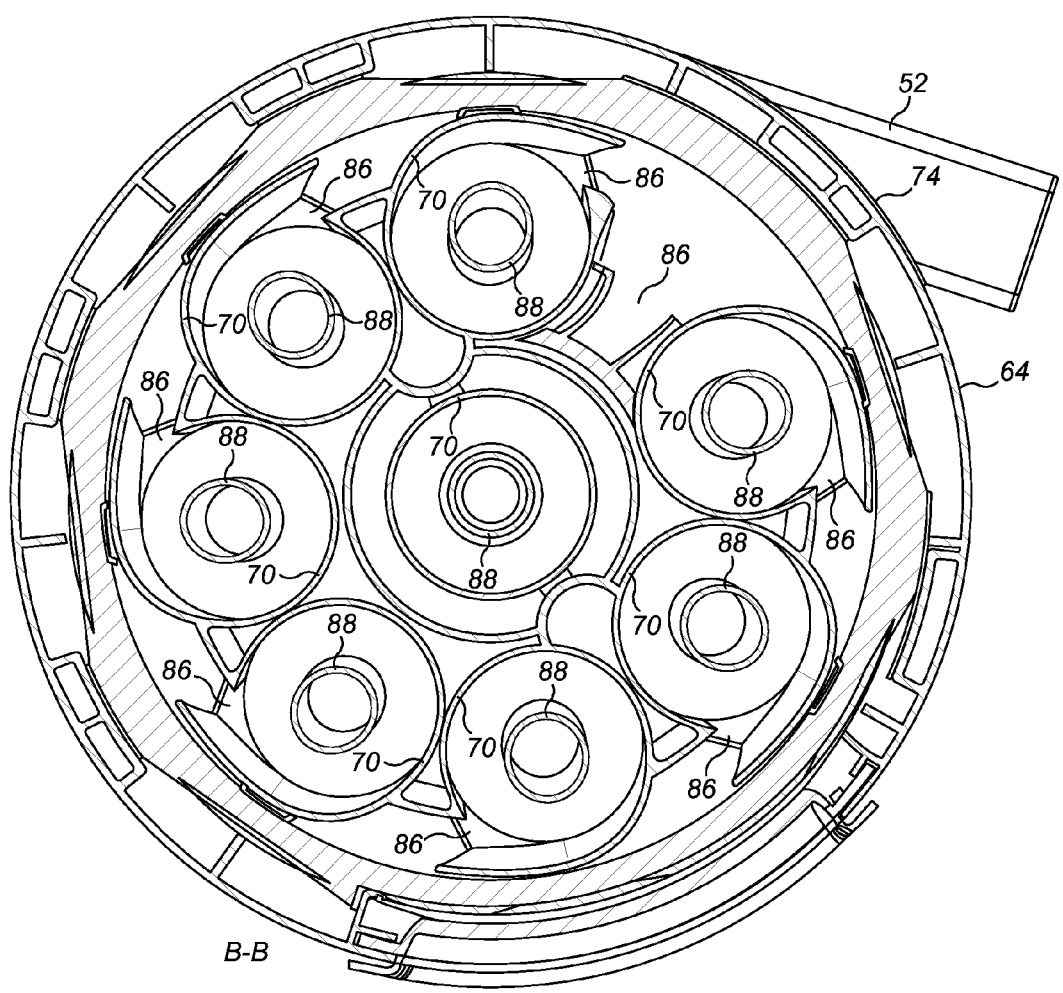

It should be noted that in this embodiment the separating apparatus 10 consists of a cyclonic separator such as disclosed in WO2008/009886, which is incorporated herein by reference. The cyclonic separator 10 is shown externally from various angles in FIGS. 1, 4 and 5, and its internal configuration is best appreciated from FIGS. 6a and 6b.

The cyclonic separating apparatus has the form of a generally cylindrical bin 62 defined by an outer wall 64 that defines an inner chamber 66, the bin 62 being oriented so that its longitudinal axis Z is substantially vertical, that is to say perpendicular to the fore-aft axis L of the main body, when it is in a docked position of the docking portion 50. A push-catch 67 is provided to releasably hold the primary separates on the docking portion 50. The outer wall 64 that defines the bin 62 is preferably a transparent plastics material so allowing a user to view the interior of the bin, although it should be appreciated that this is not essential to the invention.

Broadly, the cyclonic separator includes a first cyclone 68 defined by an upper region of the inner chamber 66, and a plurality of secondary cyclones 70 in the form of conical chambers defined by a secondary cyclone assembly 72 that is received substantially within the bin 62. The first cyclone 68 is therefore defined around the outside of the secondary cyclone assembly 72. It should be appreciated that in this context the term 'cyclone' is used in the sense of a chamber within which a cyclone of air will be generated, in use, rather than an actual flow of air per se. This use of the term is customary in the art.

The first cyclone 68 has an entry portion 74 defined by the dirty air inlet 52, as described above, which extends at a tangent to the outer wall 64 and so sets up a circulating airflow around the first cyclone 68. The lower region of the bin 62 is closed by a flat base 76, which includes several fins 78 extending upwardly therefrom which serve to disrupt the airflow in the lower region of the chamber 66 to discourage dirt from being re-entrained into the circulating airflow above.

Referring now to the secondary cyclone assembly 72, a shroud 80 in the form of a perforated cylindrical wall provides an outlet path for air in the first cyclone 68 and defines a channel 82 leading to the second cyclones 70. In this embodiment, the shroud 80 takes the form of a plastic mesh, although it may be a metal mesh, or a thicker wall provided with a uniform array of through-holes. A lip 84 is provided at the base of the shroud 80 which extends in a radial outwards direction towards the outer wall 64. This further discourages the dust in the inner chamber 66 from being re-entrained into the circulating airflow above.

The plurality of second cyclones 70 are arranged fluidly in parallel with one another and downstream of the first cyclone. In this embodiment, a total of eight second cyclones 70 are provided, although it should be appreciated that more or less cyclones may be provided if required depending on the dimensions of the bin 62. Seven of the eight second cyclones 70 are arranged in a radial pattern spaced angularly around the central axis of the separation apparatus 10. One of the second cyclones 70 is arranged in a vertical orientation and is surrounded by the rest of the secondary cyclones 70. This arrangement is shown clearly in FIG. 6b.

Each of the secondary cyclones 70 has an air inlet 86 at its upper end arranged generally at a tangent thereto and a centrally disposed air outlet 88 also located at its upper end where the cyclones are largest in diameter. A discharge opening 90 is located at a second, lower, end of each of the cyclones at the smallest diameter portion. The discharge openings 90 project into a fine dust collecting chamber 92 that is defined by a cylindrical wall 94 upstanding from the base 76 of the bin and located radially inward of, and concentric with, the outer wall 64 of the bin 62. The axes of the second cyclones 70 are tilted so that the discharge openings 90 converge in the fine dust collecting chamber 92.

Note that the term 'downstream' and 'upstream' used in respect of the first and second cyclones is in the sense that the airflow first flows through the first cyclone 68 and then continues to the second cyclones 70, so that the second cyclones are downstream of the first cyclones. Likewise, the first cyclone is upstream of the second cyclones.

In use, dirt laden air is drawn through the entry portion 74 into the chamber 66 of the bin 62 and is forced to follow a spiraling helical path around the interior of the wall 64, by which filtering action larger dirt and dust particles are separated by cyclonic action and collect in the bottom of the bin 62. The partially cleaned airflow then exits the first cyclone 68 by flowing through the shroud 80, after which the airflow enters the outlet channel 82 and flows into the tangential inlets 86 of each of the second cyclones 70. Since each of the second cyclones 70 has a smaller diameter that that of the first cyclone 68, they are able to separate smaller particles of dirt and dust from the partially cleaned airflow. Separated dirt and dust exits the second cyclones 70 via the discharge openings 90, whilst the cleaned air flows back up the second cyclones 70 and exits through the respective air outlets 88 where it passes into a manifold 96. The manifold extends across the tops of all of the air outlets 88 of the second cyclones and therefore serves as a cover for the secondary cyclone assembly 72. A subset of the second cyclones 70 are be provided with air guides 97 that are integral with the manifold and serve to guide the outflowing air from the outlets 88 of the second cyclones 70 to a central region of the manifold 96. From the manifold 96, the air flows through an outlet 98 of the cyclonic separator, as also shown externally in FIG. 5, to the airflow generator 58. The outlet 98 of the cyclonic separator is provided by the manifold 96 and is preferably of a relatively compliant material, such as rubber, as will be explained.

The bin 62 is separable from the secondary cyclone assembly 72 so that dirt and debris can be tipped out. The bin 62 has an upper rim 100 which may be engageable with the outer perimeter of the secondary cyclone assembly 72 simply by way of a push fit, or it may be retained by means of a suitable clip/catch (not shown). When the bin 62 is separated from the secondary cyclone assembly 72, this enables the dirt in the outer chamber 66, and in the fine dust collecting chamber 92 to be emptied simultaneously.

Figure 2:
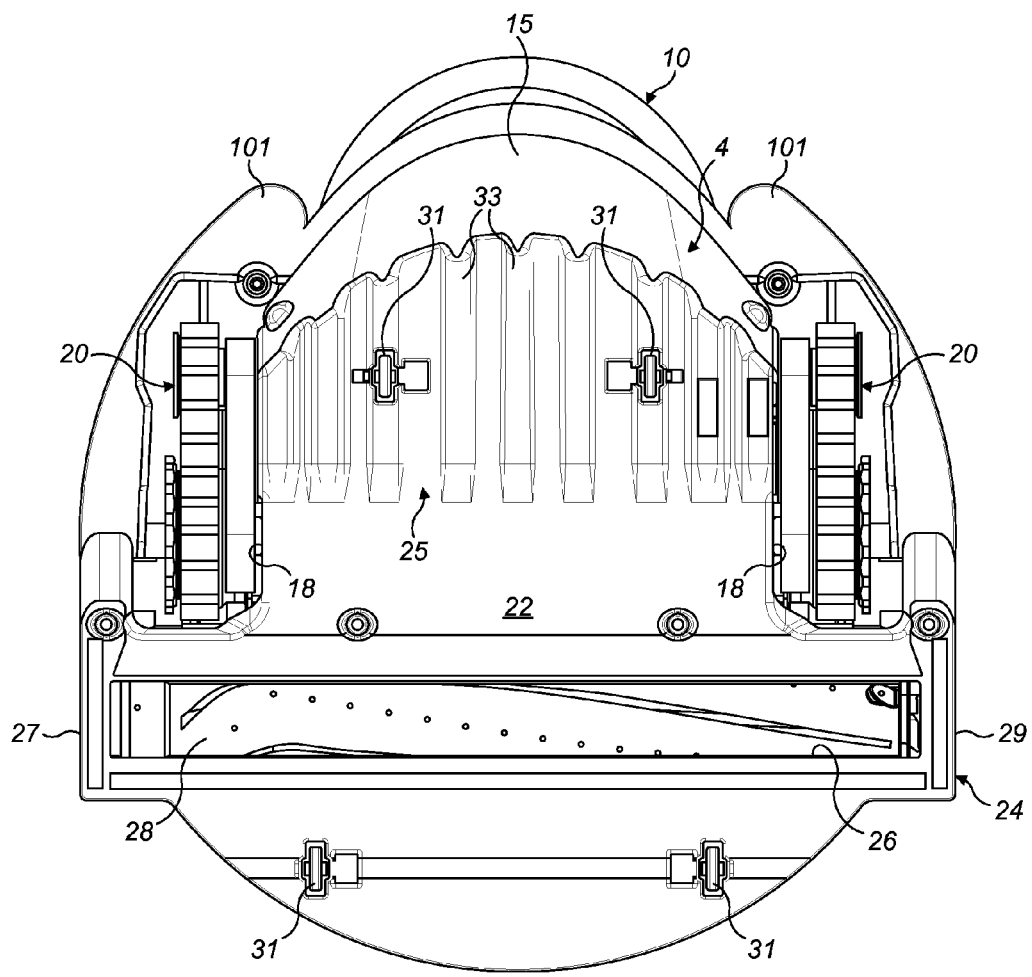
FIG. 2 is a view from beneath of the mobile robot in FIG. 1.
Figure 3:
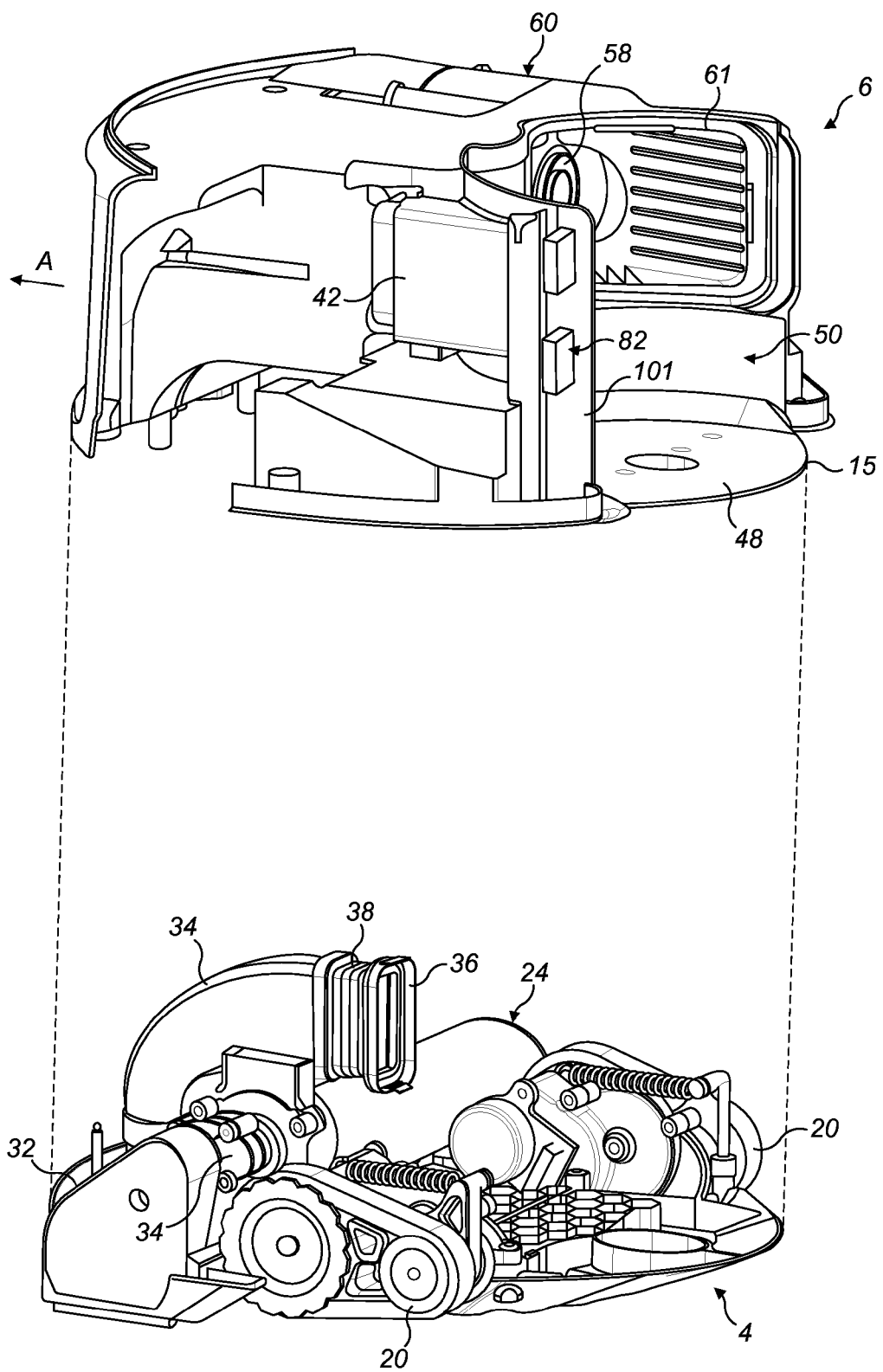
FIG. 3 is an exploded perspective view of the mobile robot of the invention showing its chassis assembly.
Figure 4:
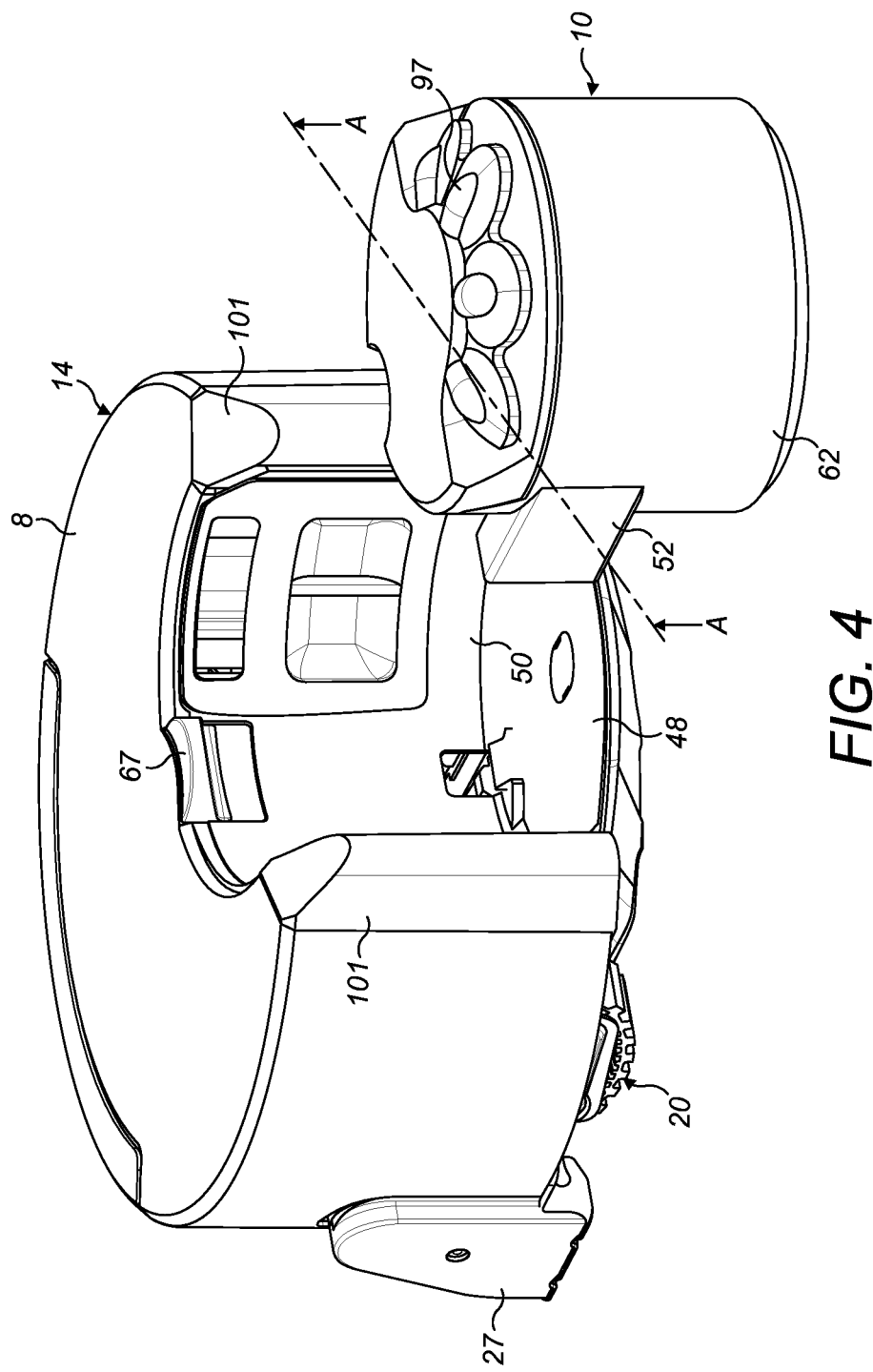
FIG. 4 is a perspective view of the mobile robot in FIG. 1, with the cyclonic separating apparatus undocked.
Figure 5:
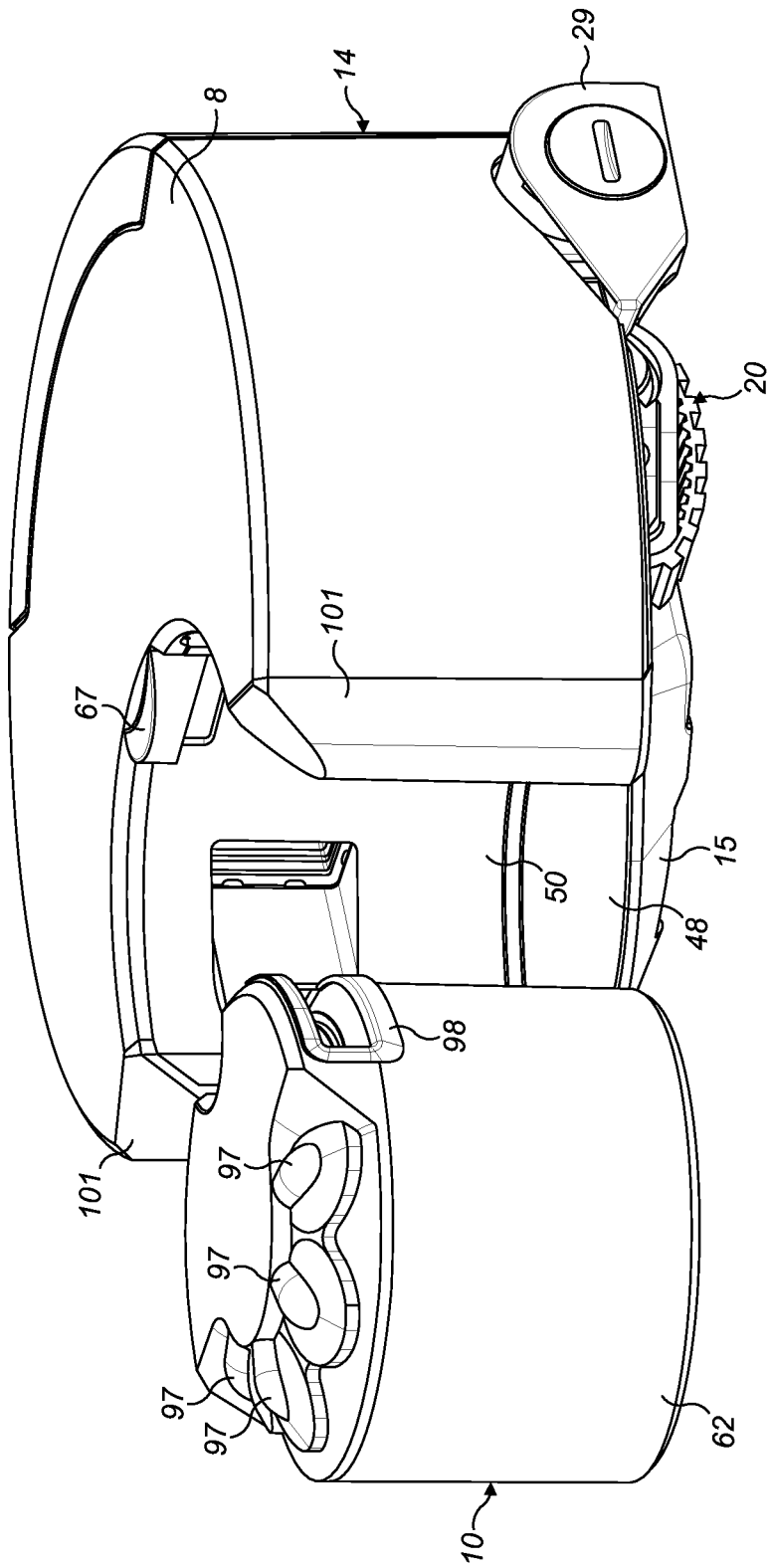
FIG. 5 is a perspective view like that in FIG. 4, but from an alternative angle to show further detail.

As can be seen particularly clearly in FIG. 2, the part-circular cut-out 12 of the cover 8 and the semi-cylindrical recess 50 in the body 6 provides a horseshoe-shaped bay defining two projecting lobes or arms 101 which flank either side of the separating apparatus 10 and leave between approximately 20% and 50%, and preferably 30%, of the apparatus 10 protruding from the front of the docking portion 50. Therefore, a portion of the separating apparatus 10 remains exposed even when the cover 8 is in place on the main body of the robot 2, which enables a user ready access to the separating apparatus 10 for emptying purposes. Therefore, a user does not need to manipulate doors, hatches or panels in order to gain access to the separating apparatus 10. Furthermore, the separating apparatus may be transparent so that a user can see how full it is, thus avoiding the need for mechanical or electronic bin-full indicators.

Figure 8:
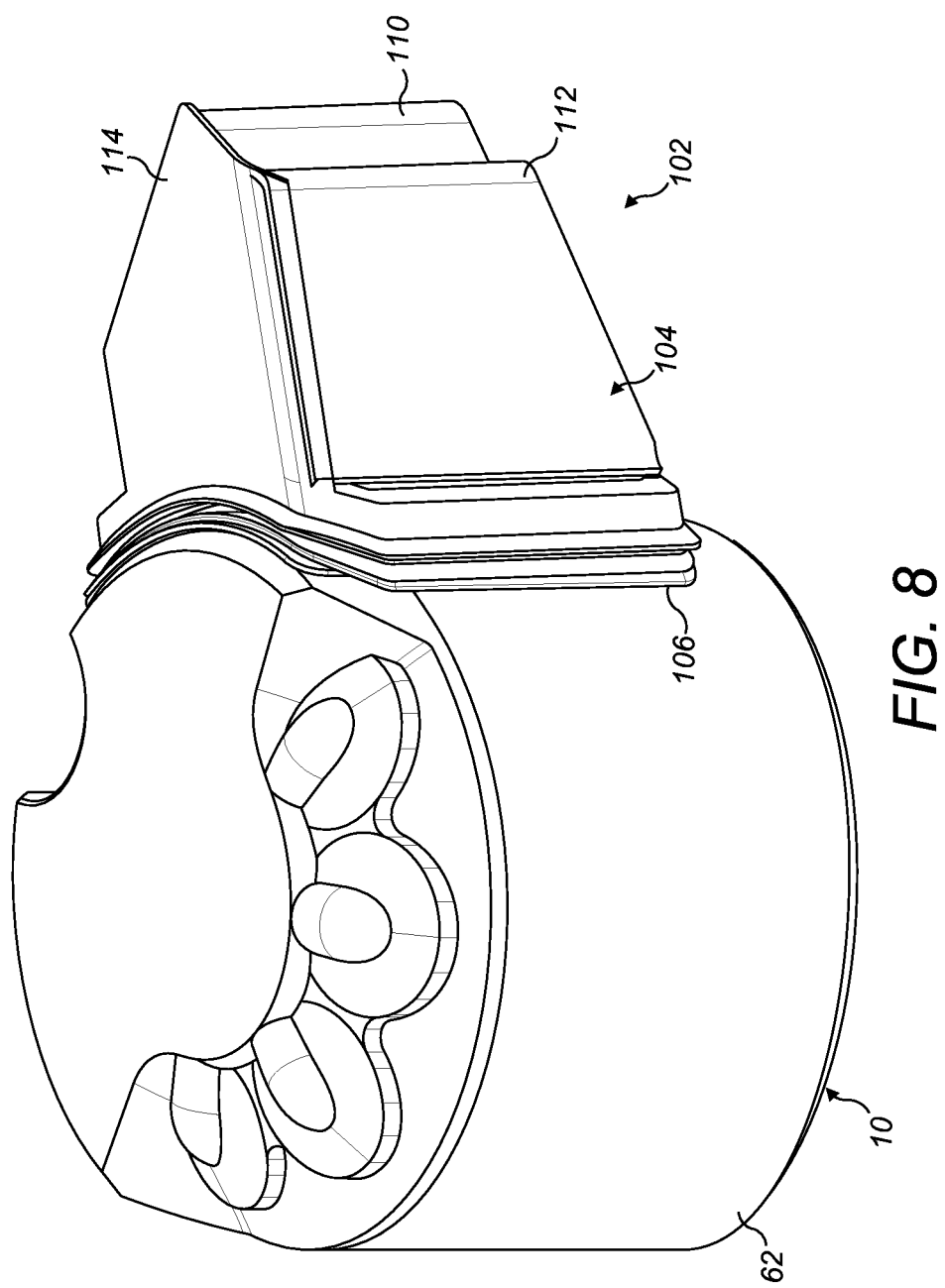
FIG. 8 is a perspective view from above of the cyclonic separating apparatus showing it engaged with the secondary separating apparatus.
Figure 9A:
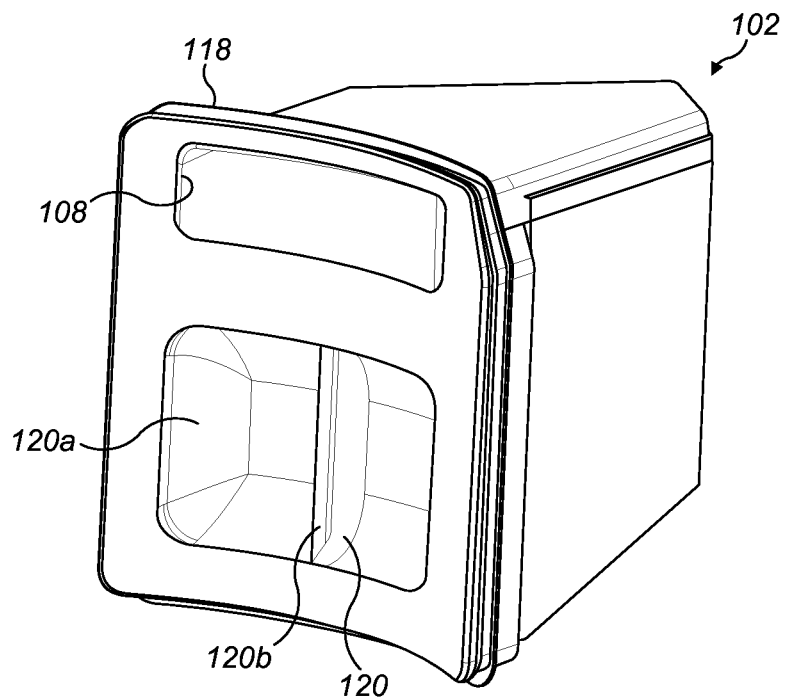
FIGS. 9a to 9d show different views of the secondary separating apparatus.
Figure 9B:
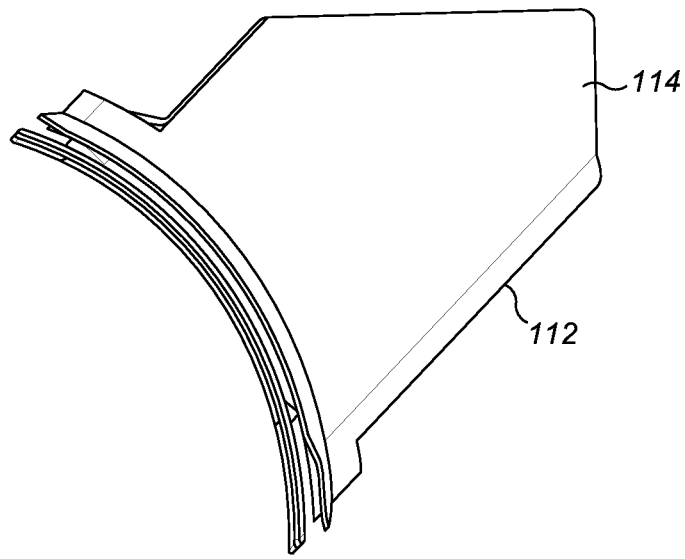
Figure 9C:
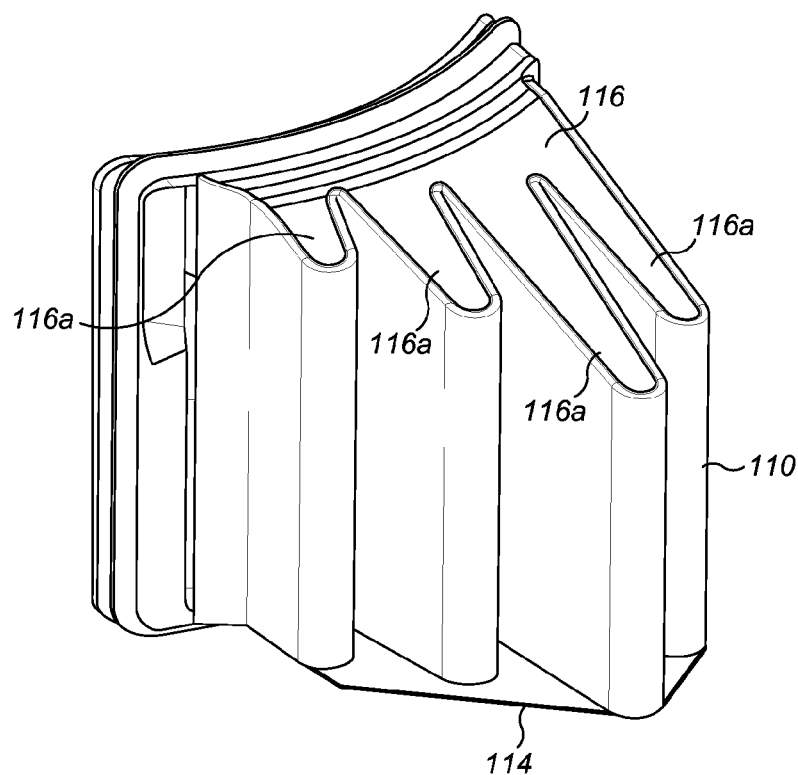
Figure 9D:
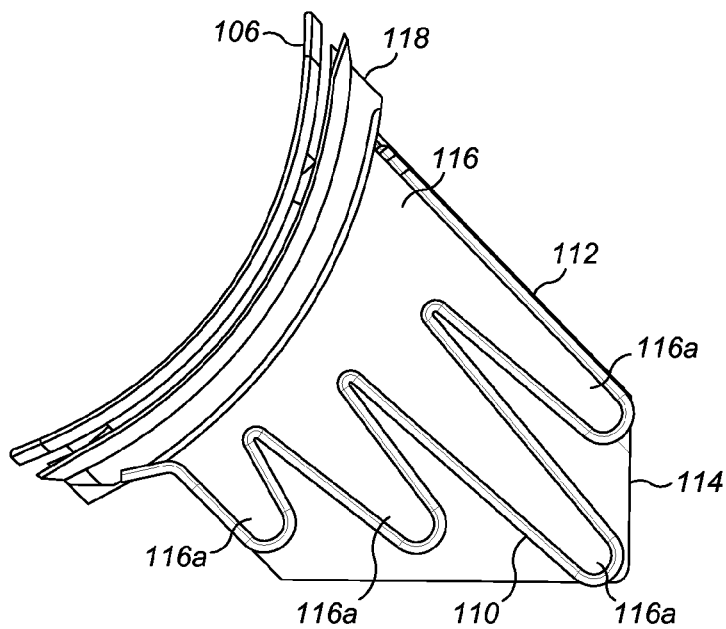
Figure 10:
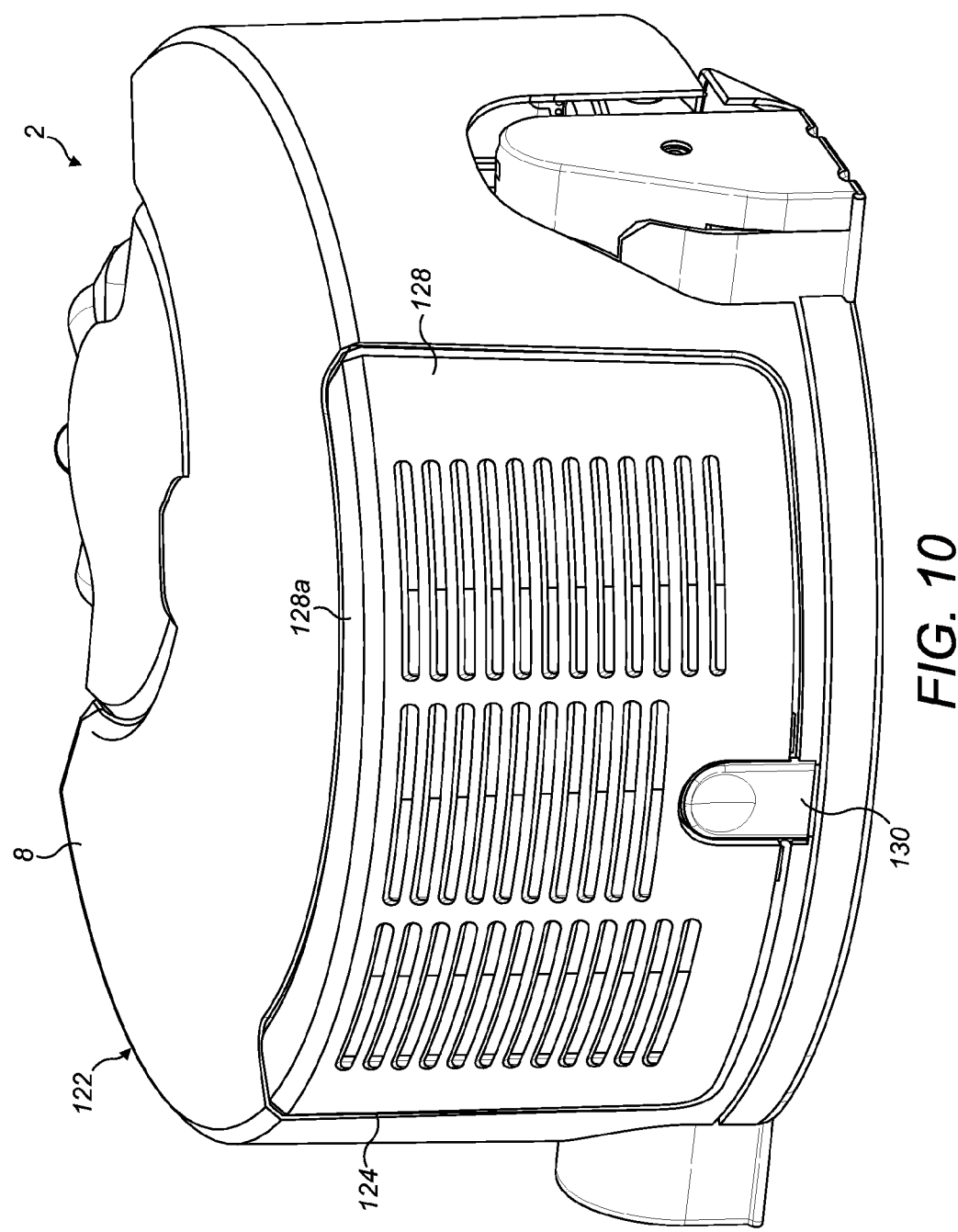
FIG. 10 shows a perspective view, from the rear, of the mobile robot in FIG. 1.

As has been described the cyclonic separating apparatus 10 discharges into the inlet mouth 61, thereby feeding into the motor and fan unit. In order to provide a further filtering facility, a secondary separating apparatus 102 is removably located in the inlet mouth 61. The secondary separating apparatus 102 comprises a filter box 104 that extends into the volume immediately upstream of the airflow generator 58, and a closure member 106 that defines a front portion of the filter box 104 and is generally rectangular in shape. The closure member 106 has a curved profile such that, when the filter box 104 is installed into the inlet mouth 61, the closure member 106 conforms to the shape of the internal wall of the docking bay portion 50. The closure member 106 includes an opening 108, being rectangular in this embodiment, which registers with the complementary-shaped clean air outlet 98 of the primary separating apparatus 10 when it is docked on the docking portion 50. This is shown particularly clearly in FIG. 8. As has been mentioned, the outlet 98 of the primary separating apparatus 10 is preferably compliant so that it can form an effective seal with the closure member 106.

The filter box 104 comprises a filter element 110 that is supported between first, second and third wall portions 112, 114, 116, respectively, that extend away from a generally square-shaped frame 118. The filter element 110 is configured into a folded configuration so as to resemble loose pleats. The cross sectional shape of the folds is supported by the third wall portion 116, which defines extending fingers 116a around which an edge of the filter element 110 is attached.

The undulating surface of the filter element 110 increases the active surface area of the secondary separating apparatus 102 which improves its filtering capacity, although it should be appreciated that other filter profiles are also acceptable, for example a planar filter member or a tightly pleated filter member. The filter box 104 therefore defines with the closure member 106 a substantially closed filter chamber which is capable of containing dirt and debris which may not have been filtered out of the air stream by the primary separating apparatus 10. One benefit of this is that the efficiency of the primary separating apparatus 10 is less crucial to the separation performance as a whole, and this allows the primary separating apparatus 10 system to be made more compact, whilst the addition of the secondary separating apparatus 102 upstream of the airflow generator 58 enables a high overall filtering efficiency to be achieved. In addition, since the filtered dirt is held in a self-contained filter box 104, there is less opportunity for dust to circulate within the main body of the robot 2. This therefore ensures that the interior of the robot 2 stays as clean as possible, which is important from a visual perspective of the user, but which provides a less harmful environment for the significant number of electronic components that are housed within the machine. Hygiene is also improved since dust is contained within the filter box and so cannot be dislodged when removing the filter box from the machine.

The closure member 106 also includes a grip portion 120 defined by a recess 120a having a central rib 120b which is suitable for being grasped by a user so that the secondary separating apparatus 102 can readily be removed from the inlet mouth 61. The closure member 106 may be releasable from the filter box 104, which allows the contents of the filter chamber to be emptied into a suitable refuse container. However, alternatively the closure member 106 need not be releasable and may instead be fixed to the frame, or be integral with it. In this case, dirt and debris may simply be emptied through the opening 108. Currently preferred is for the filter element 110 to be a washable medium so it can be regenerated by periodic washing. To this end, a flow of water may be directed on to the outer facing part of the filter element 110 so that it flows through the filter element 110 into the filter chamber and out of the opening 108. The filter element 110 may therefore readily be cleaned by a user in a simple procedure.

Turning now to FIGS. 10, 11, 12 and 13, which show the robot 2 from the rear, it can be seen that a rear portion 122 of the cover 8 includes an opening 124 of an internal chamber or cavity 126 of the robot 2. A removable panel 128 is receivable within the opening 124 to control access to the cavity 126. The panel 128 is generally rectangular in cross section, but its outer surfaces are curved so as to conform to the curvature of the side wall of the cover 8. In this embodiment, the panel 128 extends around the circumference of the cover 8 for approximately 90° of arc. An upper edge of the panel 128 defines a lipped portion 128a which is shaped to complement a respective part of the opening 124 that extends up onto the upper surface of the cover 8. As can be seen in the figures, the panel 128 is movable from a first position in which it is engaged in the opening 124, and therefore seals the cavity 126, and a second position in which it exposes the cavity 126. In this embodiment, the panel 128 has a catch 130 on its lower edge by which means the panel may be released from the body of the robot 2 and slid out of engagement with the opening 124. Alternatively, the panel 128 could be arranged to pivot open.

Figure 11:
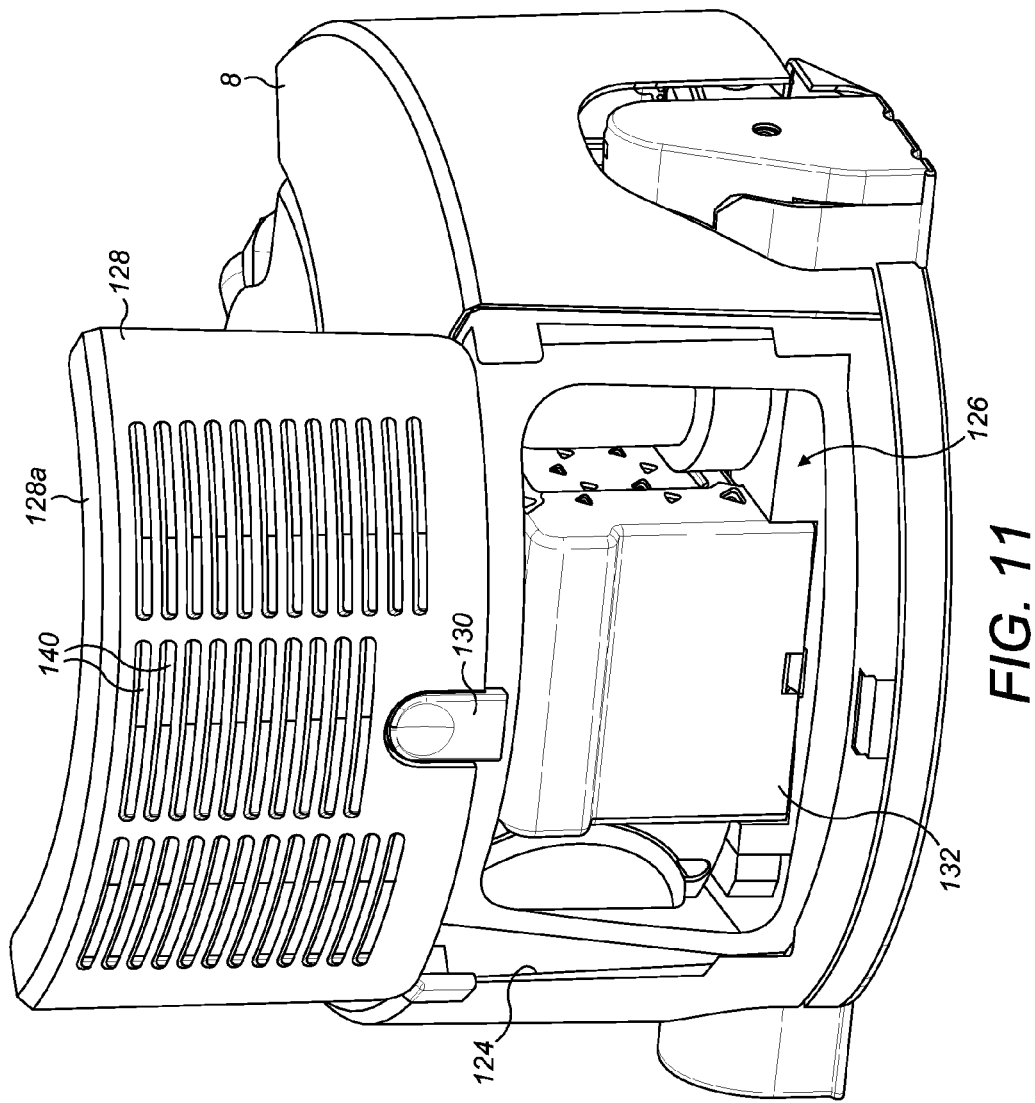
FIG. 11 is view of the mobile robot in FIG. 10, but with the rear panel removed from the body.

The cavity 126 houses a power source which, in this embodiment is a portable power source in the form of a battery pack 132. The cavity 126 therefore constitutes a battery compartment of the robot. In FIG. 11, the battery pack 132 is shown stowed in the compartment 126 and in FIG. 13 the battery pack 132 is shown removed from the compartment 126. A suitable electrical connecting arrangement 134 is provided along a lower portion of the compartment 126 in order to engage with a suitable mating connector (not shown) provided on the battery pack 132.

Figure 13:
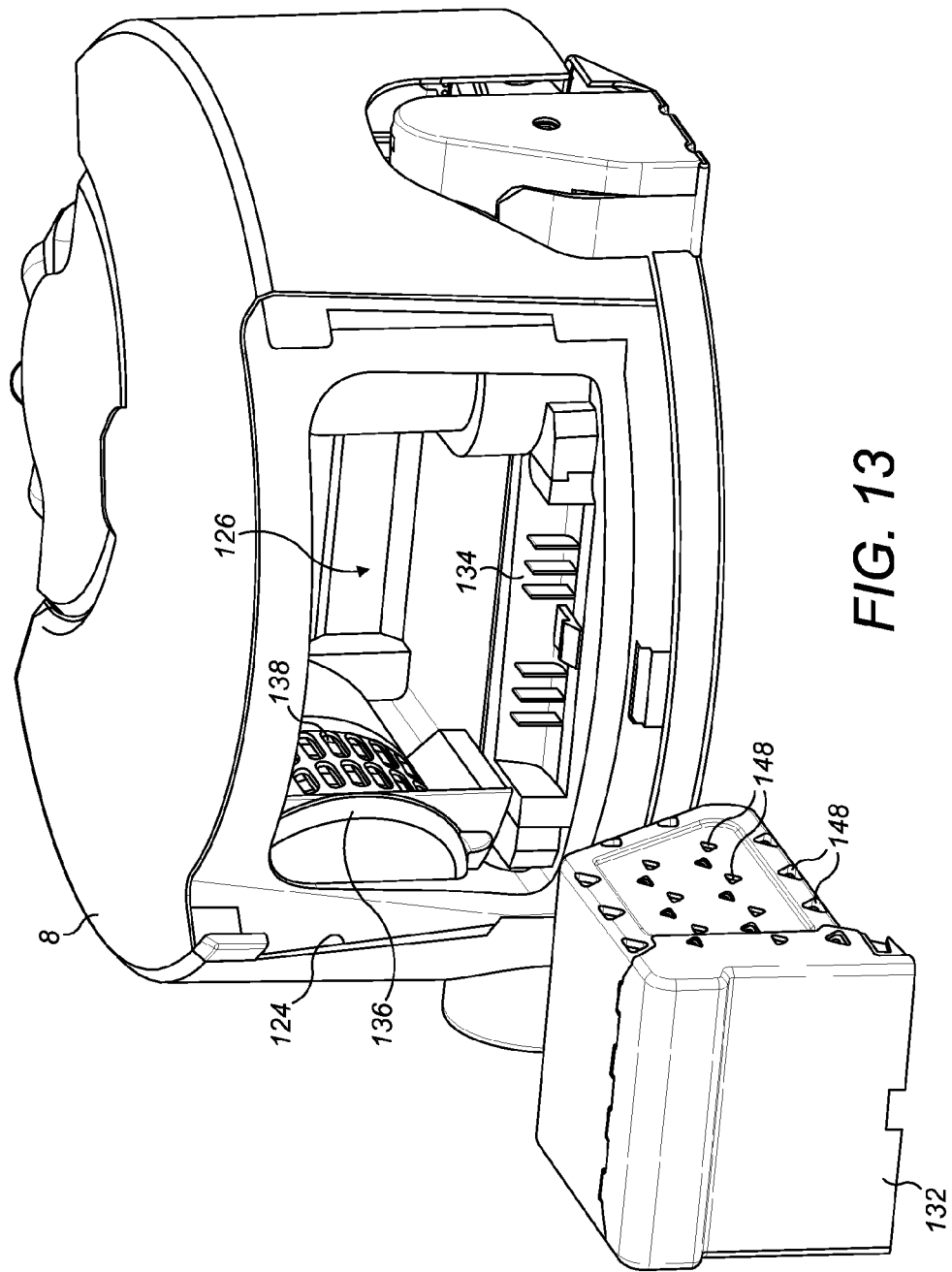
FIG. 13 is a view of the mobile robot in FIG. 10, but with the battery pack removed from the internal cavity of the mobile robot.

As can be seen in FIG. 13, a portion of the motor housing 60 defines a part of an inner wall 136 of the compartment 126. That portion of the inner wall 136 includes openings 138 through which air flow from the exhaust of the airflow generator discharges into the compartment 126.

In the illustrated embodiment, the panel 128 includes an array of horizontal openings or 'louvers' 140 through which exhausted air from the suction generator can flow to the external surroundings of the robot, although it should be noted that any configuration of openings are acceptable, as long as an airflow through the panel 128 is permitted. The panel 128 therefore constitutes the exhaust port of the robot 2. Although, within the broad inventive concept, the panel 128 does not need to incorporate a filtering capability, in the preferred embodiment the panel 128 includes a high performance filter member, preferably one which meets the HEPA standard.

Figure 12:
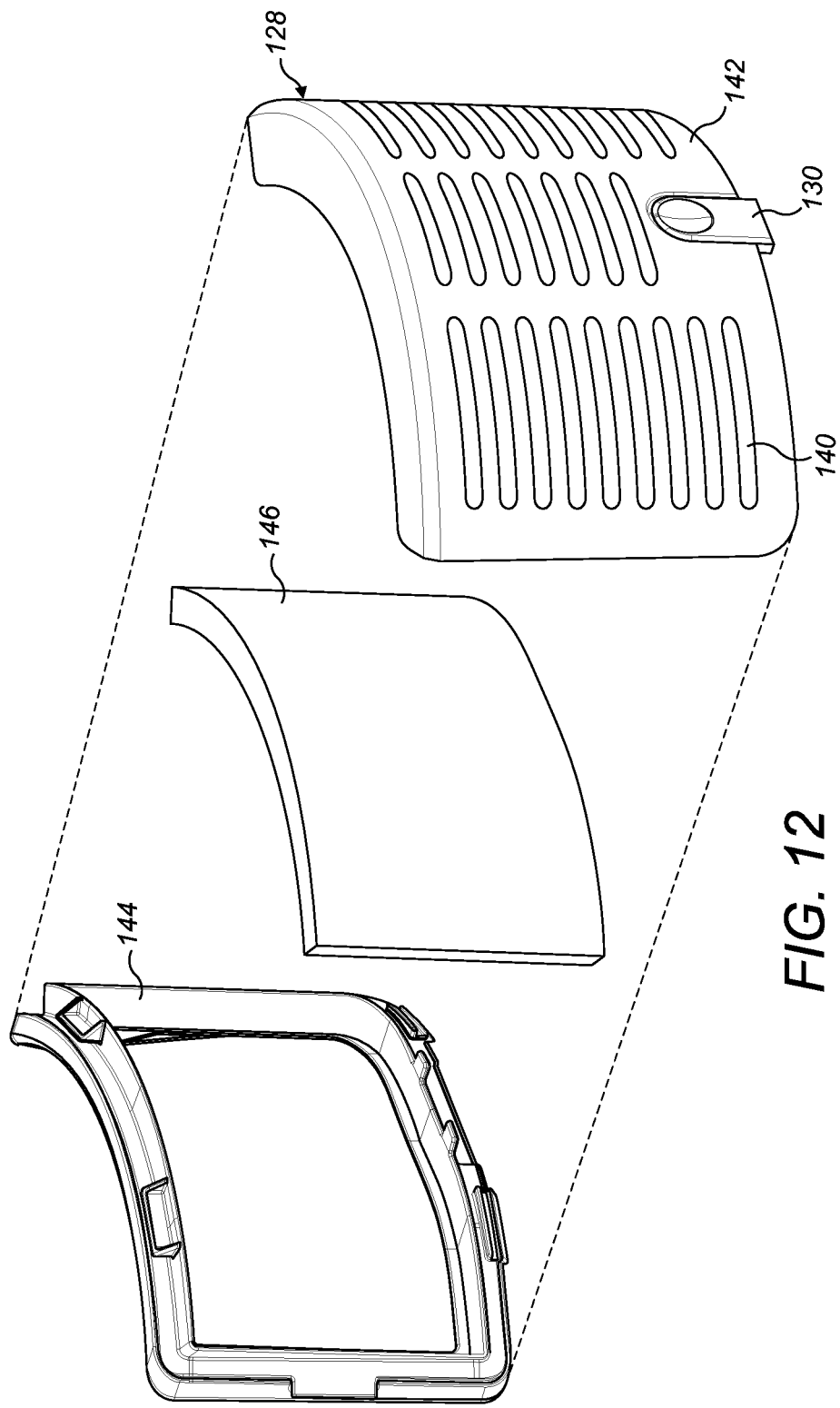
FIG. 12 is an exploded view of the rear filter assembly.

FIG. 12 shows an exploded view of the filter panel 128, and here it can be seen that the panel 128 is formed of two half portions 142, 144 that fit together to define an internal chamber. The first portion 142 defines the curves outer vented outer face of the panel and the second portion 144 defines the inner face of the panel. The internal chamber houses a washable pleated filter member 146 which, as mentioned above, is preferably a high performance filter media meeting the exacting HEPA standard. The second portion in this embodiment is in the general form of a rectangular frame that securely engages the first portion 142 and clamps the filter member 146 to it. The filter member 146 is thus sandwiched between the first and second portions 142, 144 of the panel. Therefore, the filter panel 128 in this embodiment filters any fine particulates that may be present in the exhaust flow from the suction generator.

Figure 14:
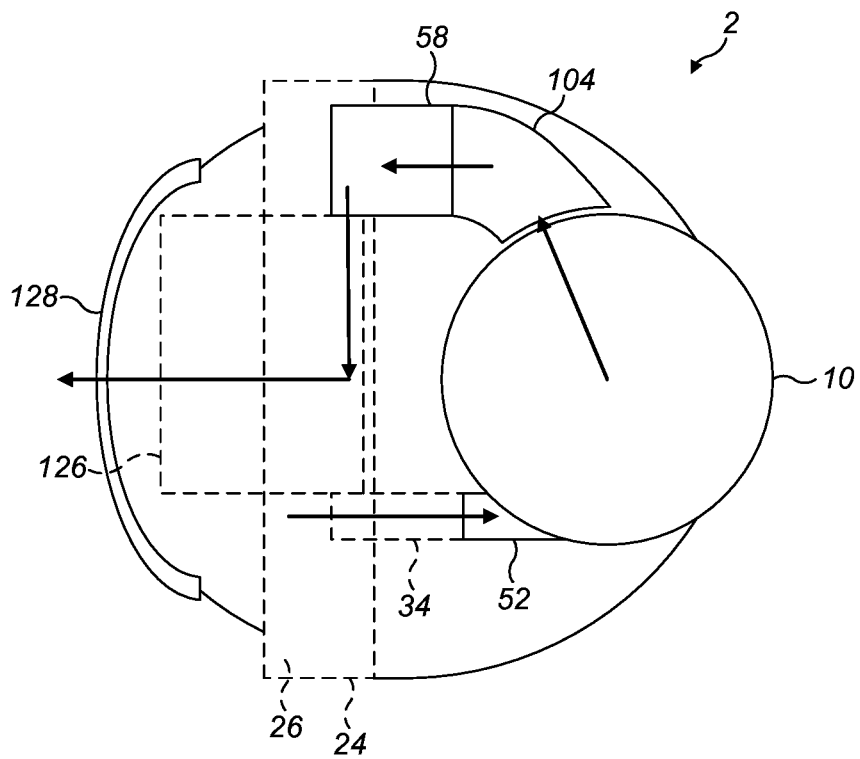
FIG. 14 is a schematic representation of the robot showing the airflow path through it.

By way of further explanation, FIG. 14 is a schematic representation of the robot 2, from above, showing the airflow path through the robot 2 from the air inlet at the suction opening 26 of the cleaner head 24, to the clean air outlet at the filter panel 128. As can be seen, dirty air flows through the suction opening 26 and into the primary separating apparatus 10 via the brush bar conduit 34 and the dirty air inlet 52 of the separating apparatus. After the dirty air has been processed by the primary separating apparatus 10, relatively clean air flows through the filter box (secondary separating apparatus) 104 to the airflow generator 58. Finally, air flows into the battery pack compartment 126 through the openings 138 in the interior wall 136 of the battery compartment and through the filter panel 128 to atmosphere.

Arranging the battery pack 132 in a compartment which is exposed to exhaust air flow in this way provides a convenient means to cool the battery pack 132 since the air flow dissipates heat from the external surface of the battery pack 132. In this specific embodiment, opposed external walls of the battery pack 132 are provided with openings 148 to allow air to circulate through the battery pack 132 and between the individual cells contained within it. The precise structure of the battery pack 132 is not central to the invention and so will not be described in further detail here.

A further benefit is that, since the battery compartment 126 forms part of the airflow path to which air is exhaust through a post-motor filter, there is no need for a dedicated battery compartment that is separate from the airflow. In effect, therefore, the battery compartment 126 is integrated into the air flow path of the machine, and particularly the part of the air flow path that contains a post-motor filter. This is a beneficial use of space, which is an important design consideration when attempting to package electronics and cleaning apparatus into a small a volume as possible.

Figure 15:
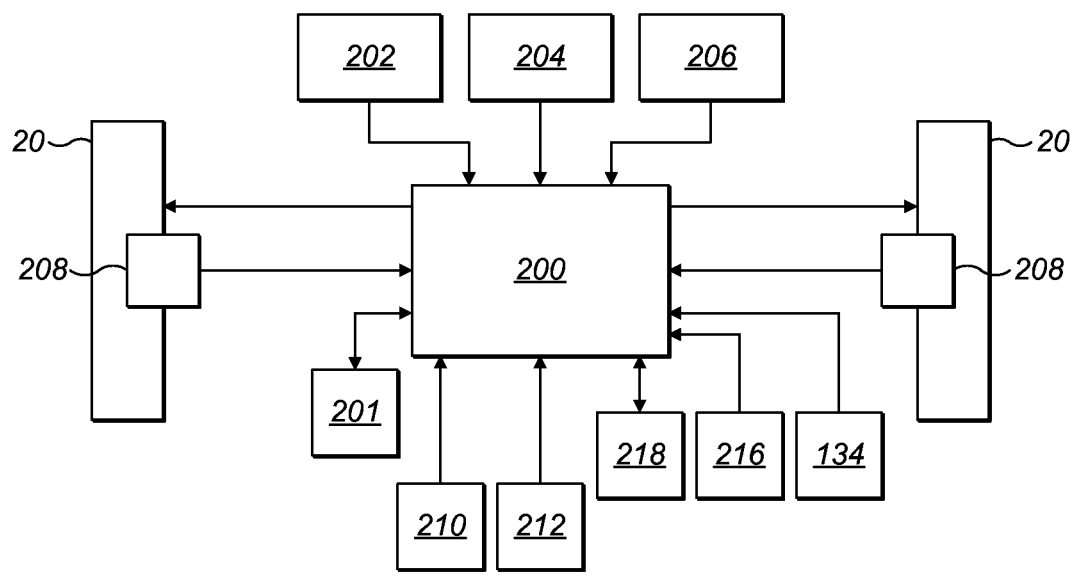
FIG. 15 is a schematic view of a control system of the robot.

In operation, the robot 2 is capable of propelling itself about its environment autonomously. To achieve this, the robot 2 carries an appropriate control system which is shown schematically in FIG. 15. The control means takes the form of a controller 200 including appropriate control circuitry and processing functionality to process signals received from its various sensors and to drive the robot 2 in a suitable manner. The controller 200 is interfaced into a sensor suite 202 of the robot 2 by which means the robot gathers information about its immediate environment in order to map its environment and plan an optimum route for cleaning. Although not shown in the figures, the sensor suite 202 may be located in the upright lobes 101 on the front of the robot which provides an unobstructed view of the path ahead. The sensor suite 202 may comprise infrared and ultrasonic transmitters and receivers providing the controller 200 with information representative of the distance of the robot 2 from various features in an environment and the size and shape of those features. Additionally the controller 200 is interfaced to the airflow generator, identified as 210 in FIG. 15, and the brush bar motor 212 in order to drive and control these components appropriately. The controller 200 is therefore operable to control the traction units 20 in order to navigate the robot 2 around the room which is to be cleaned. It should be noted that the particular method of operating and navigating the robotic vacuum cleaner is not material to the invention and that several such control methods are known in the art. For example, one particular operating method is described in more detail in WO00/38025 in which navigation system a light detection apparatus is used. This permits the cleaner to locate itself in a room by identifying when the light levels detected by the light detector apparatus is the same or substantially the same as the light levels previously detected by the light detector apparatus.

A memory module 201 is provided for the controller to carry outs its processing functionality and it should be appreciated that the memory module 201 could alternatively be integrated into the controller 200 instead of being a separate component as shown here.

The controller 200 also has suitable inputs from a user interface 204, a bump detection means 206 and suitable rotational sensing means 208 such as rotary encoders provided on the traction units 20. Power and control inputs are provided to the traction units 20 from the controller 200 and also to the suction motor 210 and the brush bar motor 212.

Finally, a power input is provided to the controller 200 from the battery pack 134 and a charger interface 216 is provided by which means the controller 200 can carry out charging of the battery pack 134 when the battery supply voltage has dropped below a suitable threshold.

Many variations are possible without departing from the inventive concept as defined by the claims. For example, it has been described that the power source is in the form of a battery pack, but the skilled person would appreciate that the battery pack may contain any suitable power cells such as lithium ion cells or nickel metal hydride. Still alternatively, the power source may be any kind of suitable power source, such as a fuel cell, or a capacitive power source, for example.

The removable panel in the embodiments above has been described as including a filter element incorporated into it, and this provides a convenient and space efficient solution for location of a filter and storage of a power source on the vacuum cleaner. As a result of this the filter panel is significantly larger than the power source. However, in an alternative configuration, the filter panel may simply be a removable door and a filter may otherwise be located in the chamber which houses the power source. In such a configuration, it is not necessary for the door to have venting means and instead cents may be provided on the side wall of the machine either side of the door.

The invention claimed is:

1. An autonomous vacuum cleaner comprising a main body comprising a dirty air inlet, a clean air outlet, an airflow path extending between the dirty air inlet and the clean air outlet, a separating apparatus arranged in the airflow path between the dirty air inlet and the clean air outlet, and an airflow generator for generating an airflow along the airflow path from the dirty air inlet to the clean air outlet, wherein the airflow generator has a discharge portion which discharges airflow into a chamber formed in the main body, the chamber including an opening that is closable by a removable panel,
wherein a power source is receivable within the chamber formed in the main body and is removable from the chamber through the opening, the removable panel is configured to permit air to pass through it so that air discharged from the airflow generator into the chamber exits the chamber through the removable panel, and the removable panel controls access to the power source and a filter element.

2. The vacuum cleaner of claim 1, wherein the removable panel controls access to the filter element such that air that passes through the panel must pass through the filter element.

3. The vacuum cleaner of claim 2, wherein the removable panel is formed from first and second portions that are engageable with one another to define a chamber that holds the filter element.

4. The vacuum cleaner of claim 1, wherein the power source includes wall portions provided with openings so as to allow a portion of the air flow in the chamber to flow through the battery pack.

5. The vacuum cleaner of claim 1, wherein the removable panel is releasably held on the opening by a catching device.

6. The vacuum cleaner of claim 1, wherein the removable panel forms part of the outer skin of the main body.

7. The vacuum cleaner of claim 6, wherein the removable panel defines a part of the side wall of the main body.

8. The vacuum cleaner of claim 7, wherein the removable panel extends around the side wall of the main body for a length being in the range of between 70 and 120 degrees of arc.

9. The vacuum cleaner of claim 8, wherein the removable panel extends around the side wall of the main body for a length being approximately 90 degrees of arc.

10. The vacuum cleaner of claim 1, wherein the separating apparatus comprises at least one cyclone.

11. The vacuum cleaner of claim 10, wherein the separating apparatus is supported on the chassis with the longitudinal axis of the separating apparatus oriented substantially normal to the chassis.

12. The vacuum cleaner of claim 11, wherein the separating apparatus comprises a first upstream cyclone and a plurality of second cyclones arranged in parallel with one another and located downstream of the first cyclone.

13. The vacuum cleaner of claim 12, wherein the upstream cyclone is generally cylindrical in shape, and wherein the plurality of downstream cyclones are frusto-conical in shape.

* * * * *